(12) United States Patent
Curti et al.

(10) Patent No.: US 7,668,377 B2
(45) Date of Patent: Feb. 23, 2010

(54) METHOD OF OBTAINING A DEPTH MAP FROM A DIGITAL IMAGE

(75) Inventors: Salvatore Curti, Palermo (IT);
Sebastiano Battiato, Acicatena (IT);
Emiliano Scordato, Palermo (IT);
Marcello Tortora, Palermo (IT);
Edoardo Ardizzone, Palermo (IT);
Marco La Cascia, Palermo (IT)

(73) Assignee: STMicroelectronics S.r.L., Agrate Brianza (IT)

( * ) Notice: Subject to any disclaimer, the term of this patent is extended or adjusted under 35 U.S.C. 154(b) by 759 days.

(21) Appl. No.: 10/893,103

(22) Filed: Jul. 15, 2004

(65) Prior Publication Data

US 2005/0053276 A1 Mar. 10, 2005

(30) Foreign Application Priority Data

Jul. 15, 2003 (IT) .......................... RM2003A0345

(51) Int. Cl.
*G06K 9/00* (2006.01)
(52) U.S. Cl. ...................................... 382/224
(58) Field of Classification Search .................. 382/224

See application file for complete search history.

(56) References Cited

U.S. PATENT DOCUMENTS

| | | | |
|---|---|---|---|
| 4,947,347 A | * | 8/1990 | Sato .......................... 345/421 |
| 2002/0031252 A1 | * | 3/2002 | Rozin .......................... 382/154 |

FOREIGN PATENT DOCUMENTS

EP 1087626 A2 * 3/2001

* cited by examiner

*Primary Examiner*—Charles Kim
*Assistant Examiner*—John W Lee
(74) *Attorney, Agent, or Firm*—Lisa K. Jorgenson; E. Russell Tarleton; Seed IP Law Group PLLC

(57) ABSTRACT

A method of obtaining a depth map from a single digital image of a three-dimensional scene containing geometric objects is provided that includes the identification in the image of at least one horizontal plane or one vertical plane of the three-dimensional scene and the assignment to every point of the image forming part of the identified plane, or to each one of the identified planes, of a depth level according to its distance from, respectively, a predetermined horizontal or vertical reference straight line of the image. In particular, the identification of at least one plane includes the identification in the image of at least two vanishing lines corresponding to two parallel lines in the plane and the assignment of a depth level made in accordance with the angular coefficients of the identified vanishing lines. Also included is a completely automatic method for obtaining a depth map from a single digital image of any three-dimensional scene.

22 Claims, 8 Drawing Sheets

METHOD OF OBTAINING A DEPTH MAP FROM A DIGITAL IMAGE

BACKGROUND OF THE INVENTION

1. Field of the Invention

The present invention relates to the processing of digital images and, more particularly, to a method of obtaining a depth map from a digital image of a three-dimensional scene.

2. Description of the Related Art

Many applications of computer-assisted graphics call for knowledge of the depth map of a digital image, i.e. the distribution of the relative depths of the image points (pixels). The relative depths of a pixel is understood as the distance of the point of the three-dimensional scene represented by the pixel from a reference plane that, as a general rule, coincides with the plane of the image. The depth map is constituted by a gray-scale image in which each pixel is assigned a value according to its depth. It is usually assumed that the higher the gray-value (lighter gray) associated with a pixel, the nearer is it situated to the reference plane. A depth map makes it possible to obtain from the starting image a second image that, together with the starting image, constitutes a stereoscopic pair providing a three-dimensional vision of the scene.

Various techniques are known for creating a depth map. Some of these are described in the publications U.S. Pat. No. 4,947,347, JP 2001155153, U.S. Publication No. 2003/0043270 and WO 02/095680. The known techniques have proved unsatisfactory for various reasons, some because they call for the analysis of various images to obtain the depth information, others because they require the intervention of an operator to identify objects of the image, and yet others because the processing times are very long.

BRIEF SUMMARY OF THE INVENTION

The disclosed embodiments of the present invention provide a method that will make it possible to produce a depth map from a single image with short processing times and to a large extent in an automatic manner. Ideally, the method for obtaining a depth map of a three-dimensional scene containing geometric objects is accomplished in a completely automatic manner.

In accordance with one embodiment of the invention, a method of obtaining a depth map from a digital image of any three-dimensional scene, i.e. a landscape scene, or a scene that essentially contains geometric objects, or a scene that contains both a landscape and geometric objects is provided.

In accordance with one embodiment of the invention, a method of obtaining a depth map from a digital image of a three-dimensional scene containing geometric objects is provided. The method includes identifying in the image at least one horizontal plane or one vertical plane of the three-dimensional scene, and assigning to each point of the image belonging to the identified plane, or to each of the identified planes, a depth level according to its distance from, respectively, a predetermined horizontal or vertical reference straight line of the image.

In accordance with another embodiment of the invention, a method of obtaining a depth map from a digital image of a three-dimensional scene is provided that includes the steps of subdividing the image into a multiplicity of homogeneous regions, associating each point of the image with a region on the basis of its chromatic characteristics; defining a multiplicity of image categories, including a first category of images containing predominantly geometric objects, a second category of images substantially devoid of geometric objects, and a third category of images containing geometric objects; identifying the category to which the image belongs and if the image belongs to the first or the third category, putting into practice the foregoing method set forth above in order to obtain a first partial depth map and if the image belongs to the second category, assigning to every point of the image a depth level in accordance with the region to which it belongs in order to form a second partial depth map; identifying a horizon line in the image; identifying the plane passing through the horizon line; and assigning to every point of the image belonging to the identified plane a depth level according to its distance from a predetermined horizontal reference line of the image in order to form a third partial depth map; obtaining the depth map from the three partial maps by means of the following criterion: if the image belongs to the first category (predominantly geometric objects, interiors), assuming the first partial map as the depth map of the image, if the image belongs to the second category (devoid of geometric objects (landscapes)), merging the second and the third partial depth maps substituting the depth values of the second map associated with points belonging to at least one predetermined region with the homogeneous regions for the corresponding depth values, as far as position in the image is concerned, of the third map, and if the image belongs to the third category (landscapes with geometric objects), merging the first and the second partial maps, substituting the depth values of the second map associated with points belonging to at least one predetermined region of the homogeneous regions with the corresponding depth values of the first partial map, after having verified the consistency by examining the regions to which there belong the points of a predetermined neighbourhood around the point in question.

In accordance with yet another embodiment of the invention, a computer system is provided for obtaining a depth map from a digital image of a three-dimensional scene containing geometric objects, the system adapted to receive an electronic digital image of a three-dimensional scene and identifying in the image at least one horizontal plane or one vertical plane of the three-dimensional scenes that comprise identifying in the three-dimensional scene at least two vanishing lines corresponding to two parallel lines in the at least one horizontal plane or one vertical plane, and assigning to each point of the image belonging to the identified plane or to each of the identified planes, a depth level according to its distance from, respectively, a predetermined horizontal or vertical reference line of the image.

In accordance with still yet a further embodiment of the invention, a computer system for obtaining a depth map from a digital image of a three-dimensional scene is provided. The system is configured for subdividing the image into a multiplicity of homogenous regions, and associating each point of the image with a region on the basis of chromatic characteristics; defining a multiplicity of image categories, including a first category of images containing predominantly interiors, a second category of images substantially devoid of interiors to depict landscapes, and a third category of images containing landscapes with the geometric objects; identifying the category to which the image belongs; if the image belongs to the first or the third category, then identifying in the image at least one horizontal plane or one vertical plane of the three-dimensional scene; assigning to each point of the image belonging to the identified plane, or to each of the identified planes, a depth level according to its distance from, respectively, a predetermined horizontal or vertical reference straight line of the image; if the image belongs to the second category, then assigning to every point of the image a depth level in accordance with a region to which it belongs in order to form a second partial depth map; identifying a horizon line in the image; identifying a plane passing through the horizon line; assigning to every point of the image belonging to the identified plane a depth level according to its distance from a predetermined horizontal reference line of the image in order to form a third partial depth map; obtaining the depth map from the three partial maps by means of the following criterion; assigning to every point of the image a depth level in accordance with the region to which it belongs in order to form a second partial depth map; identifying a horizon line in the image; identifying the plane passing through the horizon line; and assigning to every point of the image belonging to the identified plane a depth level according to its distance from a predetermined horizontal reference line of the image in order to form a third partial depth map; obtaining the depth map from the three partial maps by means of the following criterion: if the image belongs to the first category, assuming the first partial map as the depth map of the image; if the image belongs to the second category, merging the second and the third partial depth maps substituting the depth values of the second map associated with points belonging to at least one predetermined region with the homogeneous regions for the corresponding depth values, as far as position in the image is concerned, of the third map; if the image belongs to the third category, merging the first and the second partial maps, substituting the depth values of the second map associated with points belonging to at least one predetermined region of the homogeneous regions with the corresponding depth values of the first partial map, after having verified the consistency by examining the regions to which there belong the points of a predetermined neighbourhood around the point in question.

BRIEF DESCRIPTION OF THE SEVERAL VIEWS OF THE DRAWINGS

The invention will be more readily understood from the following detailed description of a non-limitative embodiment, the description being given with reference to the attached drawings, of which.

DETAILED DESCRIPTION OF THE INVENTION

Figure 1:
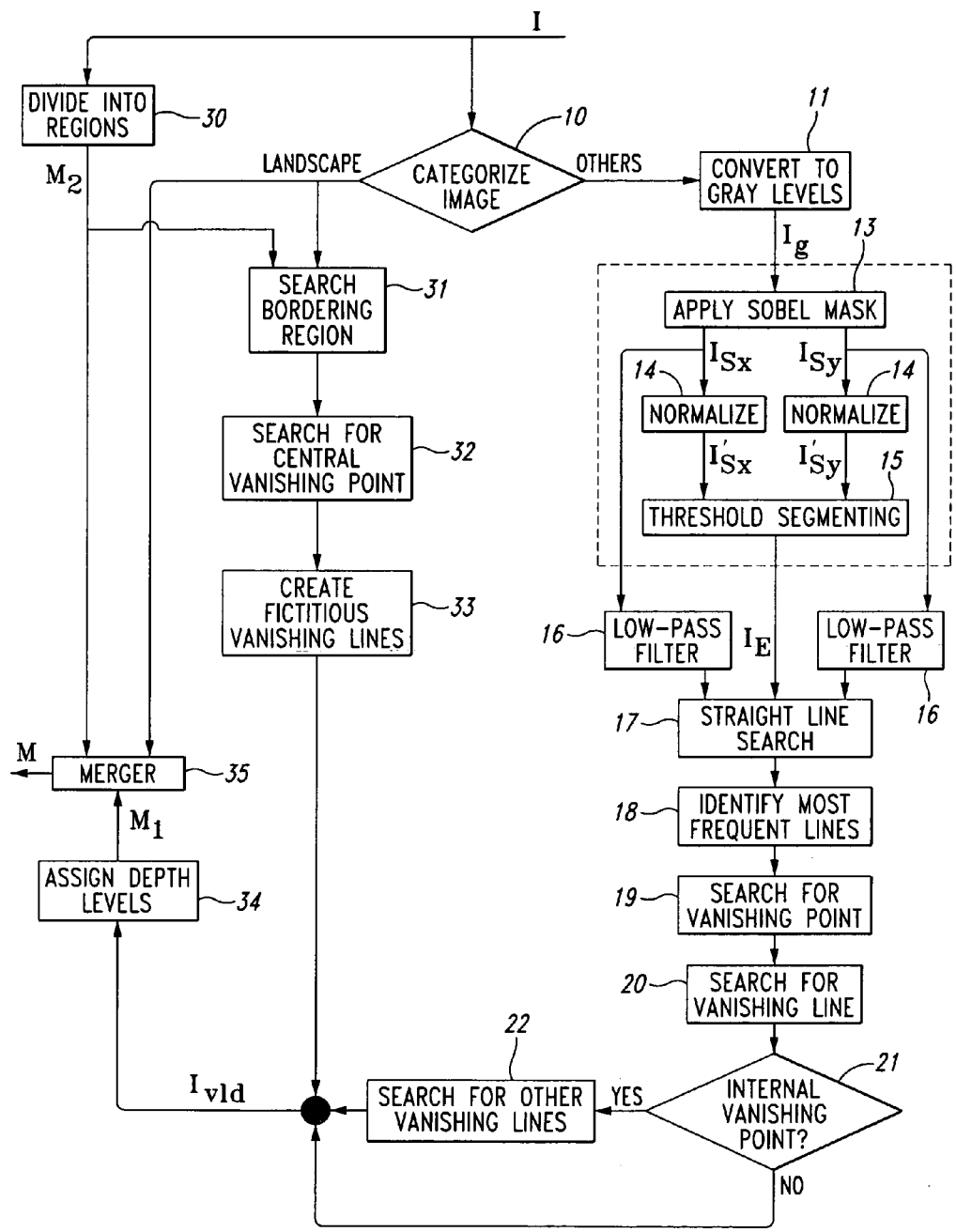
FIG. 1 is a block diagram of an embodiment of a method in accordance with the invention.

Referring to FIG. 1, a digital image 1 of a three-dimensional scene, a color image for example, is analyzed (in a decisional block 10) to determine the category or class to which it belongs. This operation may be carried out by an operator on the basis of observing the image or may be carried out in an automatic manner electronically via a computer utilizing the digital image processing techniques as disclosed herein. A method of automatically carrying out the operation is described, for example, in an Italian patent application filed by the applicant on the same day as the present application and bears the title "Metodo per classificare un'immagine digitale", designating the same inventors as are designated in the present application.

The analysis of the scene may show that the image falls into a category of images substantially devoid of geometric objects, i.e. an image category of "landscapes" or a category of images that contain geometric images, indicated by "Other" in FIG. 1. In this description the term "geometric images" is intended to identify objects or structures defined by at least a horizontal plane or at least a vertical plane in the real scene.

When the image falls into the category "Other", it is converted into a gray-scale image $I_g$ (Block 11) in order to simplify the subsequent processing and subjected to a outline detection process (block delimited by broken lines). In the present example this process comprises the application of an operator, known as the Sobel operator (Block 13), two normalization or scaling operations (Blocks 14) and a threshold segmentation or threshold operation (Block 15).

In Block 13 the Sobel operator carries out a measurement of the two-dimensional space gradient to highlight the regions of a high spatial frequency that correspond to the outlines of the objects in the image. In practice there are carried out two convolutionary products between the image $I_g$ and two Sobel masks.

$$S_y = \begin{array}{|c|c|c|} \hline -1 & 0 & 1 \\ \hline -2 & 0 & 2 \\ \hline -1 & 0 & 1 \\ \hline \end{array} \quad S_x = \begin{array}{|c|c|c|} \hline 1 & 2 & 1 \\ \hline 0 & 0 & 0 \\ \hline -1 & -2 & -1 \\ \hline \end{array}$$

obtaining:

$$I_{Sx} = I * S_x \quad (1)$$

$$I_{Sy} = I * S_y \quad (2)$$

The values of $I_{Sx}$ and $I_{Sy}$ are normalized in the Blocks 14 to be brought back into the range [0,255) of the gray levels of an image:

$$I'_{Sz}(x, y) = I_{Sz}(x, y) \times \frac{255}{1020} \quad (3)$$

where 1020 represents the maximum value that can be obtained from the application of the Sobel masks.

Block 15, which receives the results of the normalization of $I_{Sx}$ and $I_{Sy}$ as input, leads to the generation of an image $I_E$ in which there are highlighted the outlines of the starting image:

$$I_E(x, y) = \delta \quad (4)$$

where:

$$\begin{cases} \delta = 255 & \text{if } I'_{sx}(x, y) \geq t \text{ or } I'_{sy}(x, y) \geq t \\ \delta = 0 & \text{otherwise} \end{cases}$$

where t is a parameter that represents a predetermined threshold value. At the end of the process the pixels of the image $I_E$ with a gray value equal to 255 will constitute the pixels belonging to the outlines of the original image.

The images $I_{Sx}$ and $I_{Sy}$ are filtered in respective Blocks 16. Each Block 16 is constituted by a low-pass filter that operates by means of the application of the convolution of a Mask A of size 5×5 with appropriate coefficients. It is used to eliminate possible disturbance peaks present in $I_{Sx}$ and $I_{Sy}$.

$$A = \begin{array}{|c|c|c|c|c|} \hline 1/25 & 1/25 & 1/25 & 1/25 & 1/25 \\ \hline 1/25 & 1/25 & 1/25 & 1/25 & 1/25 \\ \hline 1/25 & 1/25 & 1/25 & 1/25 & 1/25 \\ \hline 1/25 & 1/25 & 1/25 & 1/25 & 1/25 \\ \hline 1/25 & 1/25 & 1/25 & 1/25 & 1/25 \\ \hline \end{array}$$

The outputs of Blocks 15 and 16 are applied to a straight-line-search block 17 that carries out a series of operations based on a procedure known as the Hough transform. As a general rule, the Hough transform makes it possible to identify various geometric configurations, like lines, circumferences or any curve that can be represented in parametric form, but in the present application it is used to identify only straight lines.

A straight line drawn in a coordinate plane x, y can be represented by the equation $$x \cos \vartheta + y \sin \vartheta = r$$

where r is the distance of the straight line from the coordinate origin and $\vartheta$ is the angle defined between r and the x-axis. Each pair of parameters r and $\vartheta$ defines a point in a parameter space or Hough space. Each point of this space therefore identifies a straight line of the Cartesian plane x,y.

For each point x,y let us now consider a bundle of straight lines passing through that point, each straight line being characterized by an angular coefficient taken from a predetermined set of discrete angular coefficients. For each angular coefficient there is calculated the distance between the origin and the straight line through that point, this distance being expressed in discrete form by utilizing a predetermined discretization. One then performs a corresponding discretization of the Hough space, for example by subdividing the Hough space into squares. These squares may be called Hough accumulation cells. To each accumulation cell there is assigned an initial count value equal to zero. For each straight line considered above there is added a unit increment to the count in the respective Hough accumulation cell.

After having considered all the straight lines passing through all the points, an analysis of the accumulation cells will make it possible to identify which of the points are aligned with each others and therefore define a straight line. More particularly, the positions of the accumulation cells with the highest values will identify a certain number of straight lines. Formalizing the operation carried out in Block 17, one obtains:

$$\text{when } I_E(x, y) = 255 \quad (5)$$

$$\begin{cases} m(x, y) = \dfrac{I_{Sy}(x, y)}{I_{Sx}(x, y)} \\ q(x, y) = y - m(x, y) \times x \end{cases}$$

where m(x,y) and q(x,y) indicate, respectively, the angular coefficient and the ordinate at the origin of the straight line passing through the point (x,y) (In the present treatment this notation is preferred to the notation indicated above, in which the straight lines are identified by the angle $\vartheta$ and the distance from the origin r).

Before passing on to the phase of memorizing the two found values in an appropriate accumulation matrix, there is performed a local check regarding their consistency. If this check yields a positive outcome, the pair (m,q) is memorized, otherwise it is discarded In particular, the check consists of observing for each pixel how many pixels in a predetermined surrounding area belong to the straight line that has just been found (it should be remembered that to verify whether or not a point belongs to a given straight line one substitutes the coordinates of the point in the equation of the straight line and observes whether equality is effectively obtained). If this number is greater than a predetermined threshold value, the consistency check is successful and the pair (m,q) can at last be memorized in the accumulation matrix.

The phase of memorizing the pair (m,q) envisages first the quantization of these two values and then the updating of the corresponding value of the accumulation matrix ACC. As regards m, there has been conceived a scale of values subdivided with an irregular interval. This interval becomes gradually smaller as zero is approached and becomes larger when one moves away from zero. All this in order to have greater detail in the range of values of m comprised between −1 and 1, where a minute variation implies straight lines with widely different slopes. To resolve the problem of the greatly inclined straight lines, which are associated with a large angular coefficient, these are represented by a value of m equal to ±8, having verified that these values well approximate these slopes. On the other hand, the vertical straight lines, which have an infinite angular coefficient, are discarded, together with the horizontal ones that have m=0, because these are of no interest for the purposes of looking for the vanishing lines. The value scale of q, on the other hand, is obtained with a regular interval.

In a practical case there have been defined 49 distinct values of angular coefficients and 200 distinct values of ordinates at the origin. In this way there was obtained an accumulation matrix ACC of size 49×200.

Once the values of m and q have been expressed in their respective scales, indicating the results of this phase with m' and q', one proceeds with updating ACC by increasing the content of the cell corresponding to the pair (m',q') by one unit, i.e.:

$$ACC[m',q'] = ACC[m',q'] + 1 \quad (6)$$

In the next phase, represented by Block 18, starting from the values present in the matrix ACC there are selected the N straight lines that occur the largest number of times. In this way one finds the N most "present" or most frequent straight lines within the image During this phase of choosing, apart from discarding the horizontal and vertical straight lines as already noted, one also checks that the straight line candidated for being taken is not too "similar" to the straight lines already selected.

Indicating a generic pair of parameters of a straight line already forming part of the set of N straight lines with $m_i$ and $q_i$, and a pair of parameters of a candidate straight line with m' and q', the latter will be discarded if the following conditions are satisfied:

$$\begin{cases} -0.15 \le (m' - m_i) \le 0.05 \text{ and } 0 \le (1' - q_i) \le 30 \\ \forall (m_i, q_i) \in \{N\} \\ -0.05 \le (m' - m_i) \le 0.15 \text{ and } -30 \le (q' - q_i) \le 0 \end{cases}$$

The N straight lines obtained are candidates for becoming the looked for vanishing lines. This fact derives from having noted that in an image with marked geometric characteristic the vanishing lines are the lines that occur most frequently, because they coincide with the greater part of the outlines of the objects present in the image.

One then passes on to looking for the vanishing point (Block 19).

A statistical approach is adopted for finding the vanishing point. The idea is that the candidate vanishing lines intersect with greater frequency in the zone containing the vanishing point.

Starting from this consideration, the need for calculating all the intersection points between the straight line found at the previous step (Block 18) seems obvious. The quantity of points found is of the order of $O(N^2)$, where N is the number of straight lines taken into consideration. The exact quantity can easily be obtained from the formula:

$$\frac{N \times (N-1)}{2} \quad (7)$$

Once this operation has been carried out, for every point there is calculated the number of intersection points that fall within a square neighborhood centered at the point. The looked-for vanishing point will be the point having the largest number of "neighbors", that is to say, it will coincide with the accumulation point of the entire image.

The next operation is the search for the vanishing lines (Block 20).

The result of the operation performed in Block 19, apart from constituting some very important information on its own account, is now used to obtain the vanishing lines starting from the N candidate straight lines found in the operation carried out in Block 18. In particular, each of these straight lines is chosen as a vanishing line if, together with another straight line, it had previously generated an intersection point falling within the neighborhood of the vanishing point. In case the straight line in question has not generated any intersections "near" the vanishing point it will be discarded. In the light of these considerations, one can affirm that the number of vanishing lines may vary between a minimum value equal to 2 and a maximum value equal to N.

The position of the found vanishing point is examined (Block 21) to verify whether it is situated outside or inside a central image zone of predetermined dimensions. If it is situated outside, one passes directly to the successive phase of assigning depth levels, otherwise one performs an intermediate search operation of searching for other vanishing lines (Block 22). This operation is necessary in order to render possible a correct identification of the planes present in the image in this particular position of the vanishing point, as will be explained later on. In particular, for every contemplated angular coefficient there is calculated the ordinate at the origin of the straight line that has this angular coefficient and passes through the vanishing point. Once the equation of the straight line has been found, the accumulation matrix ACC of the parameters is analyzed, checking whether the pair (m,q) in question had been found previously in the search for straight lines of Block 17. If the check yields a positive result, the straight line identified by the present pair of parameters is added to the set of vanishing lines. Formalizing the procedure in mathematical terms, one obtains:

$\forall m$ $q = y_{vp} - m \times x_{vp}$ if $ACC[m',q'] \neq 0$ then add $(m',q')$ to the set of vanishing_lines having used $(x_{vp}, y_{vp})$ to indicate the coordinates of the vanishing point and $(m',q')$ to indicate the approximate values of the parameters.

The information $I_{vld}(x,y)$ relating to the vanishing point and the vanishing lines is utilized for assigning a depth level to each pixel of the image, thereby obtaining a depth map of the starting image I(x,y). Similar information $I_{vld}(x,y)$ may be generated also in the case in which the analysis of the image carried out in Block 10 leads to the conclusion that the image belongs to the "Landscape" category. In that case there is identified a vanishing point, i.e. a central point of the image that is situated on the line of the horizon, and there is identified the plane passing through the line of the horizon in which there are drawn two fictitious vanishing lines that intersect at the central vanishing point. In practice, making use of the method described in the aforementioned patent application, the starting image is subdivided into a multiplicity of homogeneous regions, associating each pixel with a region on the basis of at least one of the digital values of the given pixel, for example on the basis of its chromatic characteristics (Block 30). In the example described in the said patent application the regions are: "Sky", "Very distant mountain", "Distant mountain", "Nearby mountain", "land" and "other". There is then formed a provisional or partial depth map, assigning to each pixel a depth level in accordance with the region to which it belongs. In practice, each region is labeled with a predetermined gray value and, more precisely, in such a manner that the regions closest to the observer (image plane) are labeled with a clearer gray level than that of the more distant regions. This partial map, indicated by M2, constitutes the output of Block 30, the one that subdivides into regions, and an input for a Block 31, and a Block 35.

Block 31 identifies the region adjacent to the union between the region "Land" and the region "Other". This information will be exploited in Block 34 to establish which is to be the lowest gray level to be used in the depth gradient. For example, in the case in which the adjacent region is "Sky", this is identified by a gray level equal to 0. In that case a gradient up to a gray level equal to 32 will be drawn in Block 34, while in the case of "Nearby mountain" the lowest gray level will be 100.

The central vanishing point is identified in Block 32. In particular, the following criterion is adopted to this end:

1. for every column (vertical strip having a small number of pixels of width) of the image $M_2$ there is acquired the sequence of regions starting from below:

if the first region is "Other" and its length is greater than a value temp_max (initially put as zero), then temp_max=length of first region;

2. as "border point" there is defined the point having coordinates x=W/2, y=H−temp_max, where W and H are, respectively, the width and the height of the image;

3. as "vanishing point" there is defined the point having the same ordinate as the "border point" and the abscissa equal to half the width W: the vanishing point is therefore the highest point among all the points beyond the border among the union of the regions "Land" and "Other".

Two vanishing lines intersecting at the vanishing point and having predetermined angular coefficients are created in Block 33.

The information relating to the vanishing point and the fictitious vanishing lines are applied as input to a Block 34 for assigning depth levels. The assignment process commences with the analysis of the position of the vanishing point with respect to the image. In particular, starting from its coordinates, the analysis seeks to ascertain which of the following conditions is satisfied:

$Xvp<=0$ AND$(H-1/W-1)*Xvp<Yvp<-(H-1/W-1)$
$*Xvp+H-1$(Left Case)

$Xvp>=W-1$ AND$-(H-1/W-1)*Xvp+H-1<Yvp<(H-1/W-1)*Xvp$(Right Case)

$Yvp<=0$ AND$(W-1/H-1)*Yvp<=Xvp<=(W-1/H-1)*(H-1-Yvp)$(Up Case)

$Yvp>=H-1$ AND$(W-1/H-1)*(H-1-Yvp)<=Xvp<=(W-1/H-1)*Yvp$(Down Case)

$0<Xvp<W-1$ AND $0<Yvp<H-1$(Inside Case)

where Xvp and Yvp indicate the coordinates of the vanishing point on the plane of the image and H (Height) and W (Width) indicate the dimensions of the input image.

Figure 2:
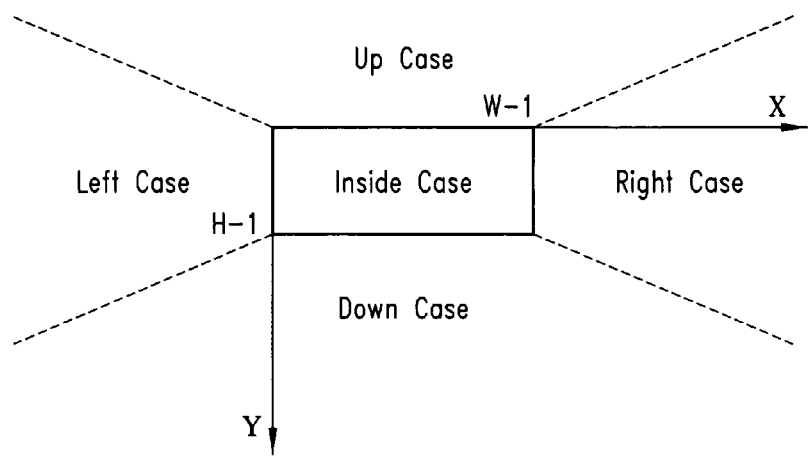
FIGS. 2 to 12 are graphs that illustrate various phases of the method in accordance with the invention.

A graphical representation of the results of the analysis described above is shown in FIG. 2, in which the image is represented by a rectangle.

Subsequently, the analysis considers the found vanishing lines, which must satisfy the following condition:

the number of vanishing lines identified must be $>=2$.

The lines are classified into 4 classes by means of the following parameters:

origin, in the image, of the vanishing line relative to the position of the vanishing point sign of the angular coefficient of the vanishing line.

The first parameter, which represents the intersection point of the vanishing line with the border of the image, indicates whether the origin of the vanishing line is situated in a position of which the coordinate $Y_o$ is smaller or greater than the coordinate $Y_{vp}$ of the vanishing point.

Figure 3:
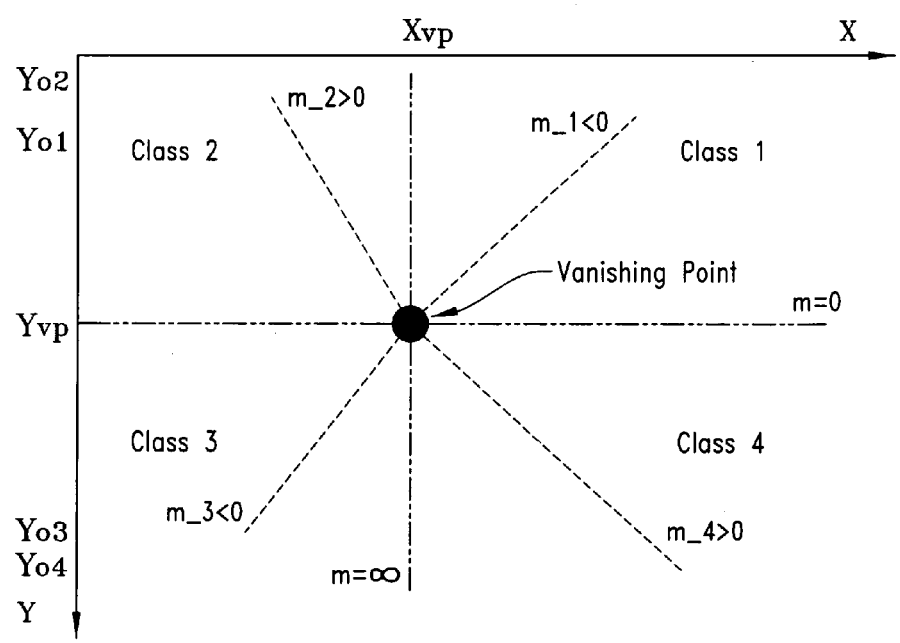

The four identified classes are therefore the following:
1. origin=up; sign_m=negative;
2. origin=up; sign_m=positive;
3. origin=down; sign_m=negative;
4. origin=down; sign_m=positive;

where down$\Rightarrow Y_o>Y_{vp}$ and up$\Rightarrow Y_o<Y_{vp}$ and are represented graphically in FIG. 3. The broken lines are examples of possible vanishing lines, the small circle indicates the vanishing point.

The analysis of the vanishing lines for each of the cases regarding the position of the vanishing point will now be described in detail:

1. Left Case/Right Case

Figure 4:
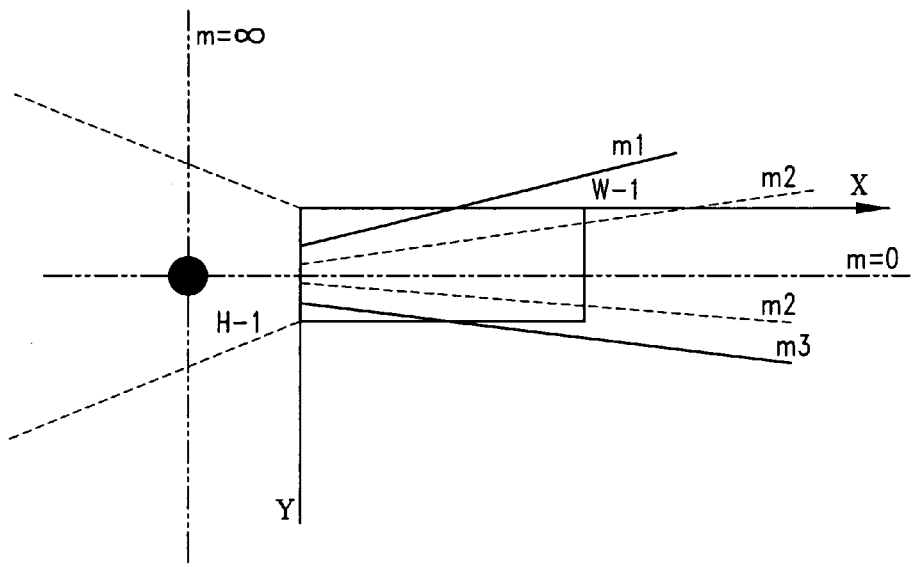
Figure 5:
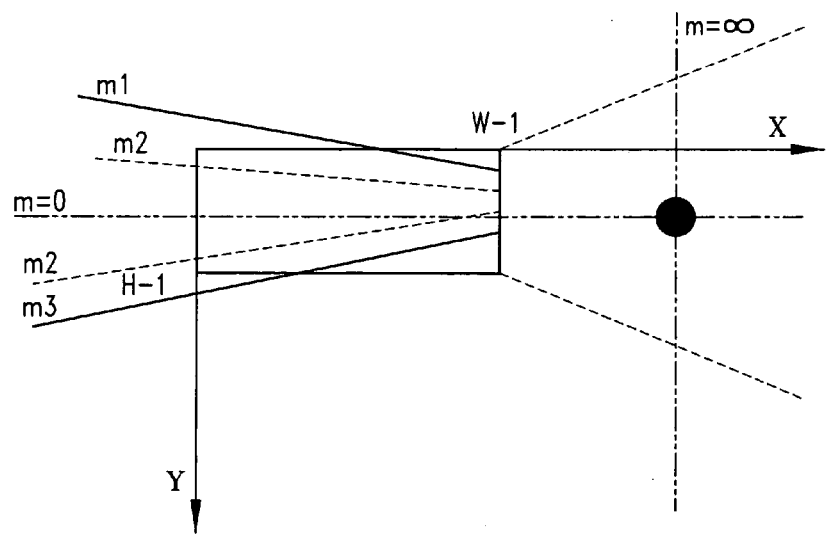

FIGS. 4 and 5 illustrate, respectively, a possible Left Case situation and a Right Case situation.

One may note that the vanishing lines can belong only to Classes 1 and 4 in the Left Case and only to Classes 2 and 3 in the Right Case.

The lines are ordered according to growing values of the angular coefficient and two lines are selected from among them in such a manner that:

Left Case:
m1=min among the angular coefficients
m3=max among the angular coefficients Right Case:
m1=max among the angular coefficients
m3=min among the angular coefficients A third vanishing line is also identified in such a manner that:

Left Case:
m2>=threshold_m2

Right Case:
m2<=-threshold_m2 where threshold_m2 indicates a predetermined slope comprised between m1 and m3, for example 0.2.

The lines to be taken into examination will therefore be 2 (m1 and m3) or 3 (m1, m2, m3):
num_lines=2.
num_lines=3.

At this point there commences the phase of generating gradient planes along which there will be drawn a depth gradient.

The angular coefficients m1, m2, m3 are analyzed for the generation of these planes and the planes (horizontal or vertical planes or both) are obtained on the basis of their values.

In particular:

if m1>=threshold_m1 (Left Case) or if m1<=-threshold_m1(Right Case)$\Rightarrow$there is generated a horizontal gradient plane defined by the two straight lines with angular coefficients m1 and m3 and in it there will be drawn a depth gradient depending on the said two straight lines;

if m3<=threshold_m3 (Left Case) or if m3>=-threshold_m3 (Right Case)$\Rightarrow$there is generated a vertical gradient plane defined by the two straight lines with angular coefficients m1 and m3 and in it there will be drawn a depth gradient depending on the said two straight lines;

if m1<threshold_m1 AND m3>threshold_m3 AND m2>=threshold_m2 (Left Case) or if m1>-threshold_m1 AND m3<-threshold_m3 AND m2<=-threshold_m2 (Right Case)$\Rightarrow$there is generated a horizontal plane and a vertical plane and in them there is drawn a depth gradient depending on the said two straight lines having angular coefficients of, respectively, m2 and m3 or m1 and m2. This choice is made on the basis of geometric considerations and for the purpose of not leaving the gradient incomplete in one of the two planes. The straight line with the angular coefficient m2 is the "border" between the two gradient planes;

if m1<threshold_m1 AND m3>threshold_m3 AND num_lines=2 (Left Case) or if m1>-threshold_m1 AND m3<-threshold_m3 AND num_lines=2 (Right Case)$\Rightarrow$there is generated a vertical gradient plane and in it there is drawn a depth gradient depending on the two straight lines having depth gradients of, respectively, m1 and m3;

where threshold_m1=threshold_m3=predetermined value chosen between 0.05 and 0.4, for example 0.3.

The result of the analysis depends greatly on the "quality" of the information received from Block 20 (search for vanishing lines). With a view to avoiding errors in case some important vanishing line has not been identified, in the cases in which there are generated only horizontal planes or only vertical planes the following parameters are analyzed:

Value of the angular coefficient m1.
Value of the angular coefficient m3.

The analysis of these parameters makes it possible to deduce the presence of a further horizontal plane (in the case in which only a vertical one is generated) or a vertical plane (in the case in which only a horizontal one is generated).

In this way there is generated a further gradient plane in which there will be drawn a depth gradient that is once again dependent on m1 and m3.

In particular:

if there has been generated a horizontal gradient plane with m1<threshold_deduction_m1 (Left Case) or m1>-threshold_deduction_m1 (Right Case)$\Rightarrow$there is generated a further vertical gradient plane with the same depth gradient as the horizontal one; the straight line with the angular coefficient m1 is the "border" between the two planes;

if there has been generated a vertical gradient plane with $m3 \geq$ threshold_deduction_m3 (Left Case) or $m3 \leq -$threshold_deduction_m3 (Right Case) $\Rightarrow$ there is generated a further horizontal gradient plane with the same depth gradient as the vertical one; the straight line with angular coefficient m1 is the "border" between the two planes;

with threshold_deduction_m1=0.3 and threshold_deduction_m3=value comprised between 0.05 and 0.4, for example 0.2.

2. Up Case/Down Case

Figure 6:
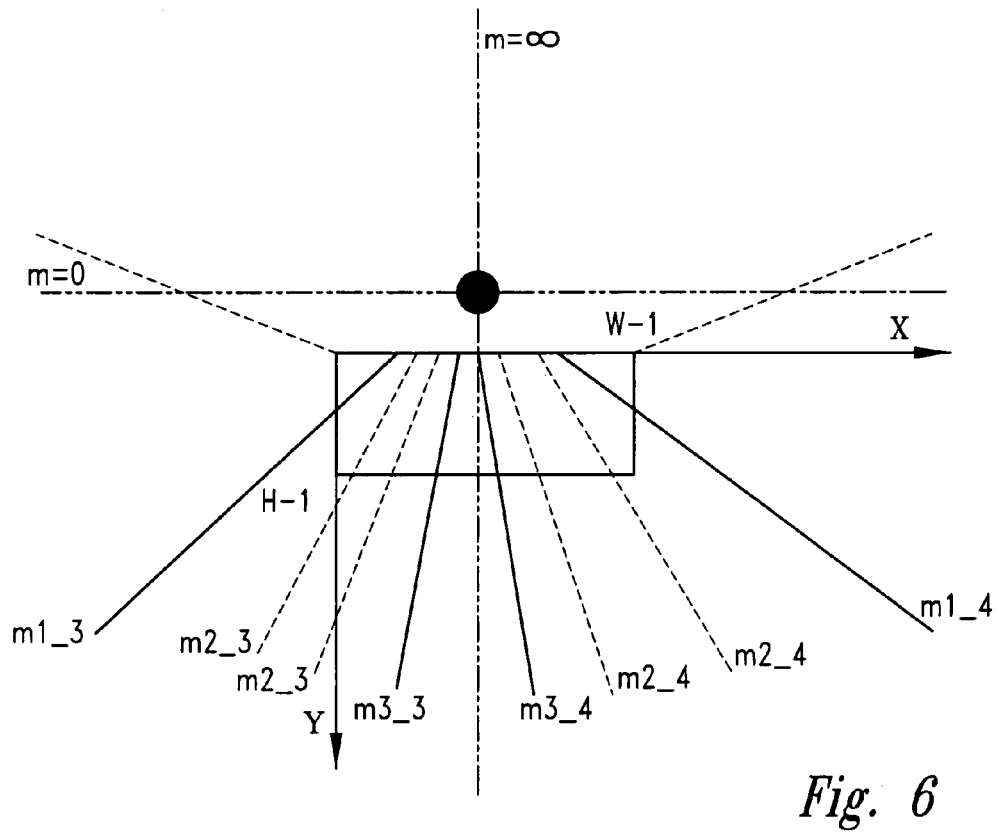
Figure 7:
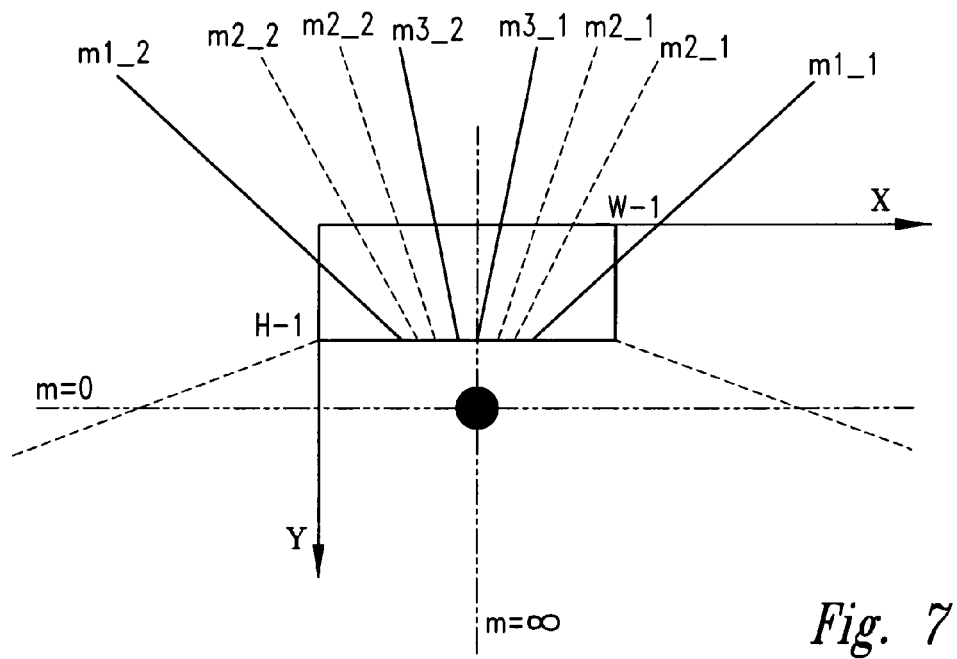

FIGS. 6 and 7 illustrate, respectively, a possible situation of the Up Case and another of the Down Case.

One should note that the vanishing lines can belong only to Classes 3 and 4 in the Up Case and only to Classes 1 and 2 in the Down Case.

The notation used in FIGS. 6 and 7 is:

m(num)_(class).

Differently from the Left Case and the Right Case, the subdivision of the vanishing lines in classes now becomes important.

The lines are subdivided into:

Up Case:
    Class 3
    Class 4

Down Case:
    Class 1
    Class 2 and are ordered within each class according to increasing values of the angular coefficient.

Obviously, one of the two classes could also be empty.

At this point there are selected two lines within each class in such a way that:

Up Case:
    m1_3=max between the angular coefficients of the vanishing lines of Class 3.
    m3_3=min between the angular coefficients of the vanishing lines of Class 3.
    m1_4=min between the angular coefficients of the vanishing lines of Class 4.
    m3_4=max between the angular coefficients of the vanishing lines of Class 4.

Down Case:
    m1_1=max between the angular coefficients of the vanishing lines of Class 1.
    m3_1=min between the angular coefficients of the vanishing lines of Class 1.
        m1_2=min between the angular coefficients of the vanishing lines of Class 2.
        m3_2=max between the angular coefficients of the vanishing lines of Class 2.

A third vanishing line is also identified in such a manner that:

Up Case:

m2_3<=threshold_m2_3 m2_4>=threshold_m2_4 where:
    if $-q1\_3/m1\_3 \geq W-1$ AND $-q3\_3/m3\_3 \geq W-1 \Rightarrow$ threshold_m2_3=predetermined value chosen between $-0.05$ and $-0.04$, for example $-0.2$;
    otherwise $\Rightarrow$ threshold_m2_3=predetermined value chosen between $-0.7$ and $-1.3$, for example $-1$;
    if $-q1\_4/m1\_4 \leq 0$ AND $-q3\_4/m3\_4 \leq 0 \Rightarrow$ threshold_m2_4=predetermined value chosen between 0.05 and 0.4, for example 0.2;
    otherwise $\Rightarrow$ threshold_m2_4=predetermined value chosen between 0.7 and 1.3, for example 1;
    and q(num)_(class) is the notation used to indicate the ordinate at the origin of a straight line.

Down Case:

m2_1<=threshold_m2_1 m2_2>=threshold_m2_2 where:
    if $H-1-q1\_1/m1\_1 \leq 0$ AND $H-1-q3\_1/m3\_1 \leq 0 \Rightarrow$ threshold_m2_1=predetermined value chosen between $-0.05$ and $-0.4$, for example $-0.2$;
    otherwise $\Rightarrow$ threshold_m2_1=predetermined value chosen between $-0.7$ and $-1.3$, for example $-1$;
    if $H-1-q1\_2/m1\_2 \geq W-1$ AND $H-1-q3\_2/m3\_2 \geq W-1 \Rightarrow$ threshold_m2_2=predetermined value chosen between 0.05 and 0.4, for example 0.2;
    otherwise $\Rightarrow$ threshold_m2_2=predetermined value chosen between 0.7 and 1.3, for example 1
    and q(num)_(class) is the notation used to indicate the ordinate at the origin of a straight line.

The lines to be taken into examination will therefore be 2 or 3 in each class:
    num_lines_class=2
    num_lines_class=3

At this point there commences the phase of generating the gradient planes along which there will be drawn a depth gradient.

For generating the planes there are analyzed the angular coefficients m1_3, m2_3, m3_3, m1_4, m2_4, m3_4 (Up Case) or m1_1, m2_1, m3_1, m1_2, m2_2, m3_2 (Down Case), and planes (horizontal or vertical planes or both) are obtained on the basis of their values.

In particular, we shall have:
    if m1_3<=threshold_m1_3 (Up Case) or if m1_1<=threshold_m1_1 (Down Case) $\Rightarrow$ there is generated a horizontal gradient plane and in it there will be drawn a depth gradient depending on the two straight lines having an angular coefficient of, respectively, m1_3 and m3_3 (Up Case) or m1_1 and m3_1 (Down Case);
    if m3_3>=threshold_m3_3 (Up Case) or if m3_1>=threshold_m3_1 (Down Case) $\Rightarrow$ there is generated a vertical gradient plane, and in it there will be drawn a depth gradient depending on the two straight lines having an angular coefficient of, respectively, m1_3 and m3_3 (Up Case) or m1_1 and m3_1 (Down Case);
    if m1_3>threshold_m1_3 AND m3_3<threshold_m3_3 AND m2_3<=threshold_m2_3 (Up Case) or if m1_1>threshold_m1_1 AND m3_1<threshold_m3_1 AND m2_1>threshold_m2_1 (Down Case) $\Rightarrow$ there is generated a horizontal plane and a vertical plane and in them there will be drawn a depth gradient depending on the two straight lines having an angular coefficient of, respectively, m2_3 and m3_3 or m1_3 and m2_3 (Up Case) or, respectively, m2_1 and m3_1 or m1_1 and m2_1 (Down Case); this choice is made on the basis of geometric considerations and for the purpose of not leaving the gradient incomplete in one of the two planes; the straight line with angular coefficient m2_3 (Up Case) or m2_1 (Down Case) is the "border" between the two gradient planes;
    if m1_3>threshold_m1_3 AND m3_3<threshold_m3_3 AND num_lines_3=2 (Up Case) or if m1_1>threshold_m1_1

AND m3_1<threshold_m3_1 AND num_lines_1=2 (Down Case)⇒there is generated a vertical gradient plane and in it there will be drawn a depth gradient depending on the two straight lines having an angular coefficient of, respectively, m1_3 and m3_3 (Up Case) or m1_1 and m3_1 (Down Case);

if m1_4>=threshold_m1_4 (Up Case) or if m1_2>=threshold_m1_2 (Down Case)⇒there is generated a horizontal gradient plane, and in it there will be drawn a depth gradient depending on the two straight lines having an angular coefficient of, respectively, m1_4 and m3_4 (Up Case) or m1_2 and m3_2 (Down Case);

if m3_4<=threshold_m3_4 (Up Case) or if m3_2<=threshold_m3_2 (Down Case)⇒there is generated a vertical gradient plane, and in it there will be drawn a depth gradient depending on the two straight lines having an angular coefficient of, respectively, m1_4 and m3_4 (Up Case) or m1_2 and m3_2 (Down Case);

se m1_4<threshold_m1_4 AND m3_4>threshold_m3_4 AND m2_4>=threshold_m2_4 (Up Case) or if m1_2<threshold_m1_2 AND m3_2>threshold_m3_2 AND m2_2>=threshold_m2_2 (Down Case)⇒there is generated a horizontal plane and a vertical plane, and in them there will be drawn a depth gradient depending on the two straight lines having an angular coefficient of, respectively, m2_4 and m3_4 or m1_4 and m2_4 (Up Case) or, respectively, m2_2 and m3_2 or m1_2 and m2_2 (Down Case). This choice is made on the basis of geometric considerations and for the purpose of not leaving the gradient incomplete in one of the two planes; the straight line with angular coefficient m2_4 (Up Case) or m2_2 (Down Case) is the "border" between the two gradient planes;

if m1_4<threshold_m1_4 AND m3_4>threshold_m3_4 AND num_lines_4=2 (Up Case) or if m1_2<threshold_m1_2 AND m3_2>threshold_m3_2 AND num_lines_2=2 (Down Case)⇒there is generated a vertical gradient plane, and in it there will be drawn a depth gradient depending on the two straight lines having an angular coefficient of, respectively, m1_4 and m3_4 (Up Case) or m1_2 and m3_2 (Down Case);

where:

Up Case:

if −q1_3/m1_3>=W−1 AND −q3_3/m3_3>= W−1 ⇒ threshold_m1_3=threshold_m3_3=predetermined value chosen between 0.05 and −0.5, for example −0.3;

otherwise⇒threshold_m1_3=threshold_m3_3= predetermined value between −0.7 and −1.3, for example −1;

if −q1_4/m1_4<=0 AND −q3_4/m3_4<=0⇒threshold_m1_4=threshold_m3_4=predetermined value chosen between 0.05 and 0.5, for example 0.3;

otherwise⇒threshold_m1_4=threshold_m3_4= predetermined value chosen between 0.7 and 1.3, for example 1;

and q(num)_(class) is the notation used to indicate the ordinate at the origin of a straight line.

Down Case:

if $H-1-q1\_1/m1\_1<=0$ AND $H-1-q3\_1/m3\_1<=0$ ⇒ threshold_m1_1=threshold_m3_1=predetermined value chosen between −0.05 and −0.5, for example −0.3;

otherwise⇒threshold_m1_1=threshold_m3_1= predetermined value chosen between −0.7 and −1.3, for example −1;

if $H-1-q1\_2/m1\_2>=W-1$ AND $H-1-q3\_2/m3\_2>=W-1$ ⇒ threshold_m1_2=threshold_m3_2=predetermined value chosen between 0.05 and 0.5, per example 0.3 otherwise⇒threshold_m1_2=threshold_m3_2= predetermined value chosen between 0.7 and 1.3, for example 1;

and q(num)_(class) is the notation used to indicate the ordinate at the origin of a straight line.

The result of the analysis depends greatly on the "quality" of the information received from Block 20 (search for vanishing lines). With a view to avoiding errors in case some important vanishing line has not been identified, in the case in which only horizontal planes or only vertical planes are generated, the following parameters are analyzed:

Up Case:
  Value of the angular coefficient m1_3.
  Value of the angular coefficient m3_3.
  Value of the angular coefficient m1_4.
  Value of the angular coefficient m3_4.

Down Case:
  Value of the angular coefficient m1_1.
  Value of the angular coefficient m3_1.
  Value of the angular coefficient m1_2.
  Value of the angular coefficient m3_2.

The analysis of these parameter makes it possible to deduce the presence of a further horizontal plane (in case only a vertical plane is generated) or a vertical plane (in case only a horizontal plane is generated).

In this way there is generated a further gradient plane in which there will be drawn a depth gradient that is once again dependent on m1_3 and m3_3 in Class 3 and m1_4 and m3_4 in Class 4 (Up Case) or dependent on m1_1 and m3_1 in Class 1 and m1_2 and m3_2 in Class 2 (Down Case).

In particular:

if there has been generated a horizontal gradient plane with m1_3>=threshold_deduction_m1_3 (Up Case) or m1_1>=threshold_deduction_m1_1 (Down Case)⇒there is generated a further vertical gradient plane with the same depth gradient as the horizontal plane; the straight line with the angular coefficient m1_3 (Up Case) or m1_1 (Down Case) is the "border" between the two planes;

if there has been generated a vertical gradient plane with m3_3<=threshold_deduction_m3_3 (Up Case) or m3_1<=threshold_deduction_m3_1 (Down Case)⇒there is generated a further horizontal gradient plane with the same depth gradient as the vertical plane; the straight line with the angular coefficient m3_3 (Up Case) or m3_1 (Down Case) is the "border" between the two planes;

if there has been generated a horizontal gradient plane with m1_4<=threshold_deduction_m1_4 (Up Case) or m1_2<=threshold_deduction_m1_2 (Down Case)⇒there is generated a further vertical gradient plane with the same depth gradient as the horizontal plane; the straight line with the angular coefficient m1_4 (Up Case) or m1_2 (Down Case) is the "border" between the two planes;

if there has been generated a vertical gradient plane with m3_4>=threshold_deduction_m3_4 (Up Case) or m3_2>=threshold_deduction_m3_2 (Down Case)⇒there is generated a further horizontal gradient plane with the same depth gradient as the vertical plane; the straight line with the angular coefficient m3_4 (Up Case) or m3_2 (Down Case) is the "border" between the two planes;

where:

Up Case:
threshold_deduction_m1_3=threshold_deduction_m3_3 predetermined value chosen between −1.7 and −1.3, for example −1.5;
threshold_deduction_m1_4=threshold_deduction m3_4=predetermined value chosen between 1.7 and 1.3, for example 1.5.

Down Case:
threshold_deduction_m1_1=threshold_deduction_m3_1=predetermined value chosen between −1.7 and −1.3, for example −1.5;
threshold_deduction_m1_2=threshold_deduction_m3_2=predetermined value chosen between 1.7 and 1.3, for example 1.5.

Lastly, the results obtained from both classes of vanishing lines are grouped together to obtain the definitive gradient planes in which the assigned gradient will be the one found in Class 3 or Class 4 (Up Case) or the one found in Class 1 or Class 2 (Down Case).

This choice is made on the basis of geometric considerations and for the purpose of not leaving the gradient incomplete in one of the planes.

3. Inside Case

Figure 8:
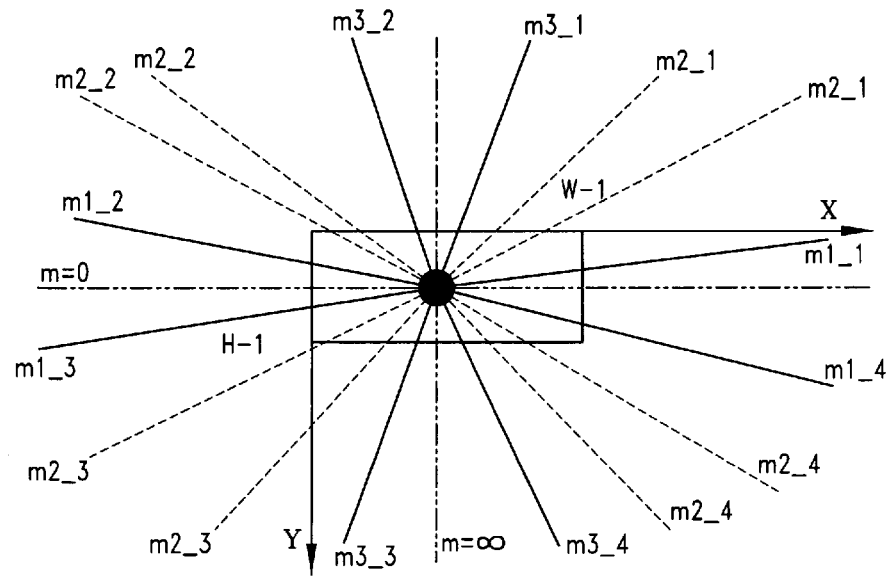

FIG. 8 illustrates a possible situation in which the vanishing point is in a central zone of the image (Inside Case).

One should note that in this case the vanishing lines can belong to all the classes.

The notation used in FIG. 8 is:

$$m(num)\_(class).$$

First of all, there are analyzed all the found vanishing lines and these lines are then made to pass through the vanishing point $(X_{vp}, Y_{vp})$.

To this end the values of the ordinate at the origin $q_i$ of all the vanishing lines are modified in such a manner as to satisfy the following condition:

$$Y_{vp}=m_i*X_{vp}+q_i \Rightarrow q_i=Y_{vp}-m_i*X_{vp}$$

The next step consists of subdividing the vanishing lines into: Class 1, Class 2, Class 3 and Class 4.

According to the results obtained, there are then applied the methods seen in the previous cases.

Once the "gradient planes" have been found, a gray level corresponding to a depth level is assigned to each pixel of the gradient planes.

It has been assumed that:
The higher (lighter) the gray level assigned to a pixel, the "closer" is it situated to the observer.

The closer one comes to the vanishing point, the further one moves away from the observer (this is almost always true).

The assignment is made for rows in the horizontal gradient planes and for columns in the vertical planes with the depth level increasing in the direction of the vanishing point, starting from a line of the image that is, respectively, horizontal or vertical, in this example one of the border lines of the image.

The law of assigning the depth is approximated by a curve that is sectionally linear and depends on the values of the angular coefficients m1 and m2 of the straight lines that generate the plane.

Figure 9:
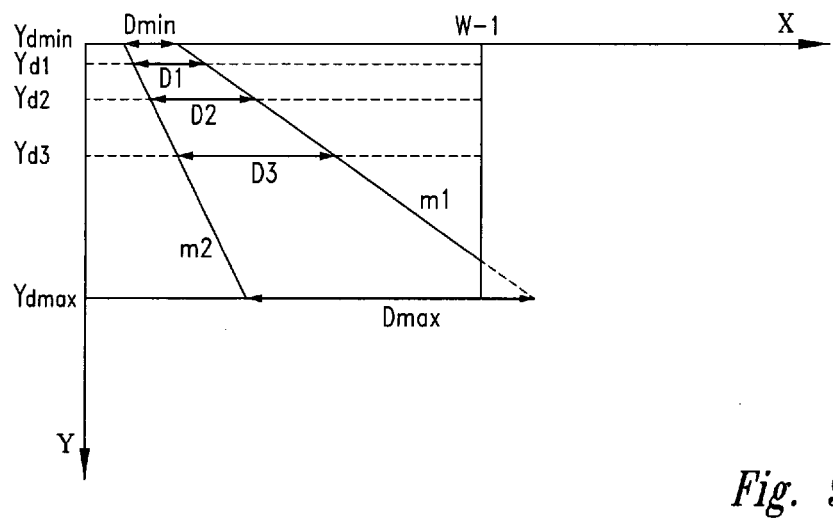

Referring now to FIG. 9, if a horizontal gradient plane is generated by two vanishing lines having angular coefficients m1 and m2, the distances indicated in the figure can be calculated by means of the following formulas:

$$D_{min}=\min\{|(y-q1)/m1-(y-q2)/m2|:0<=(y-q1)/m1<=W-1\|0<=(y-q2)/m2<=W-1\} \text{ with } Y_0<=y<=Y_H; \quad (8)$$

$$D_{max}=\max\{|(y-q1)/m1-(y-q2)/m2|:0<=(y-q1)/m1<=W-1\|0<=(y-q2)/m2<=W-1\} \text{ with } Y_0<=y<=Y_H; \quad (9)$$

$$D1=D_{min}+(D_{max}-D_{min})/16; \quad (10)$$

$$D2=D1+(D_{max}-D_{min})/8; \quad (11)$$

$$D3=D2+(D_{max}-D_{min})/4; \quad (12)$$

where $Y_0$ and $Y_H$ are such that:
$Y_0=0$ $Y_H=H-1$ in Left Case, Right Case, Up Case and Down Case;
$Y_0=0$ $Y_H=Y_{vp}$ in Inside Case with vanishing lines of Class 1 or Class 2;
$Y_0=Y_{vp}$ $Y_H=H-1$ in Inside Case with vanishing lines of Class 3 or Class 4.

In the example shown in FIG. 9:

$$D_{min}=q2/m2-q1/m1; \quad (13)$$

$$D_{max}=(H-1-q1)/m1-(H-1-q2)/m2; \quad (14)$$

On the gradient plane there are identified four plane strips as follows:
between $D_{max}$ and $D_3 \Rightarrow 0<=x<=W-1$ AND $Y_{d3}<=y<=Y_{dmax}$;
between $D_3$ and $D_2$; $\Rightarrow 0<=x<=W-1$ AND $Y_{d2}<=y<=Y_{d3}$;
between $D_2$ and $D_1$; $\Rightarrow 0<=x<=W-1$ AND $Y_{d1}<=y<=Y_{d2}$;
between $D_1$ and $D_{min} \Rightarrow 0<=x<=W-1$ AND $Y_{dmin}<=y<=Y_{d1}$;

On each of these strips the gradient varies linearly for rows.

Therefore, if the number of gray levels to be assigned is N, there will be assigned N/4 gray levels with linear variations for each strip.

Figure 10:
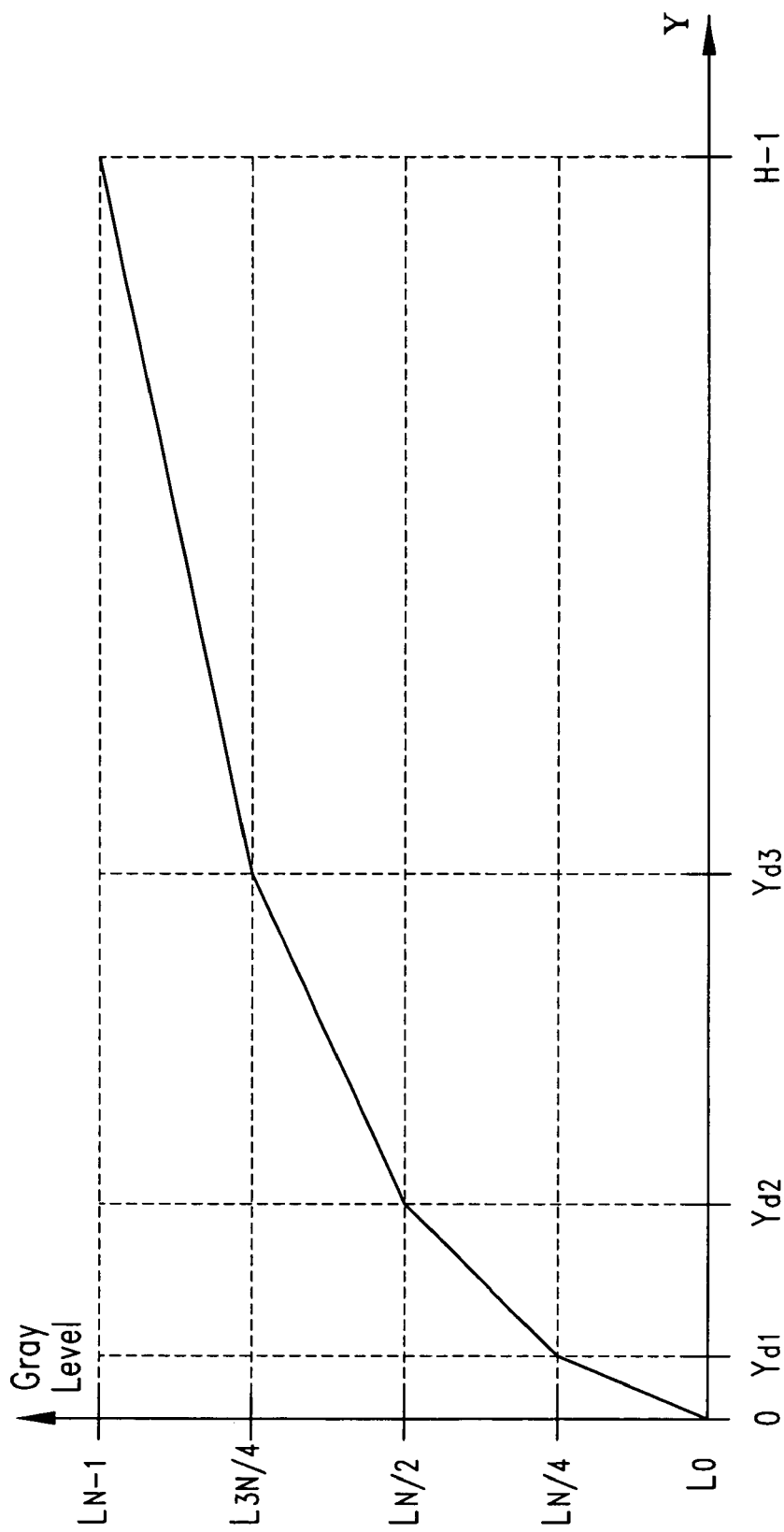

FIG. 10 shows a qualitative graph of the sectionally linear curve relating to the case of FIG. 9; the ordinates represent the gray value assigned to each row $Y_i$ of the image.

Figure 11:
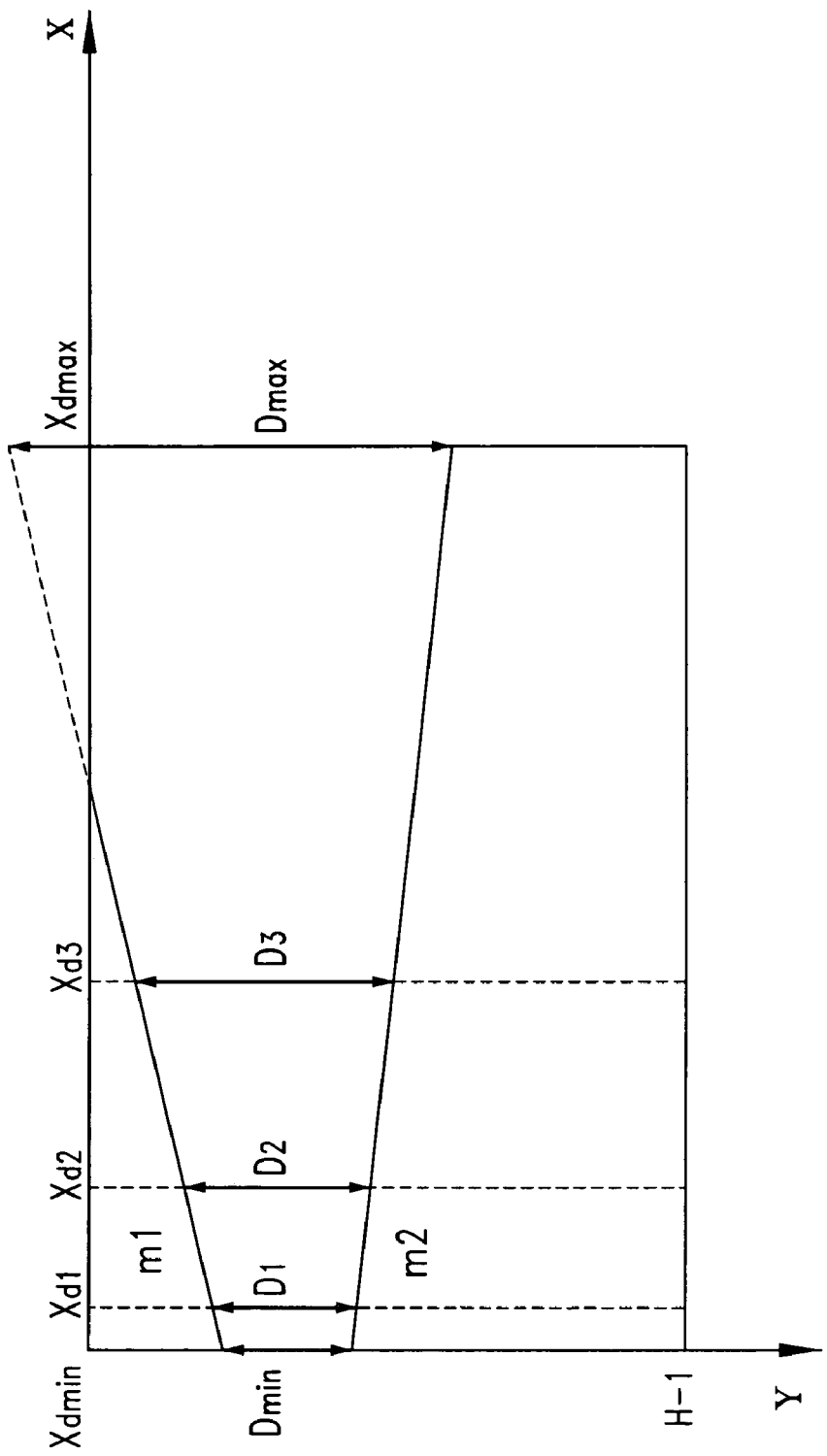

Similarly, for a vertical gradient plane; referring to FIG. 11, we have:

$$D_{min}=\min\{|(m1-m2)*x+q1-q2|:0<=m1*x+q1<=H-1\|0<=m2*x+q2<=H-1\} con X_0<=x<=X_W; \quad (15)$$

$$D_{max}=\max\{|(m1-m2)*x+q1-q2|:0<=m1*x+q1<=H-1|0<=m2*x+q2<=H-1\} con X0<=x<=XW; \quad (16)$$

where $X_0$ and $X_W$ are such that:
$X_0=0$ $X_W=W-1$ in Left Case, Right Case, Up Case and Down Case;
$X_0=0$ $X_W=X_{vp}$ in Inside Case with vanishing lines of Class 2 or Class 3;
$X_0=X_{vp}$ $X_W=W-1$ in Inside Case with vanishing lines of Class 1 or Class 4.

For calculating $D_1$, $D_2$, $D_3$ it is sufficient to substitute equations (15) and (16) in, respectively, equations (10), (11) and (12).

In the example shown in the figure:

$$D_{min}=q1-q2; \quad (17)$$

$$D_{max}=(m2-m1)(W-1)+q2-q1; \quad (18)$$

Four plane strips are identified on the gradient plane as follows:
between $D_{max}$ and $D_3 \Rightarrow 0<=y<=H-1$ AND $X_{d3}<=x<=X_{dmax}$;
between $D_3$ and $D_2$; $\Rightarrow 0<=y<=H-1$ AND $X_{d2}<=x<=X_{d3}$;
between $D_2$ and $D_1$; $\Rightarrow 0<y<=H-1$ AND $X_{d1}<=x<=X_{d2}$;
between $D_1$ and $D_{min}$. $\Rightarrow 0<=y<=H-1$ AND $X_{dmin}<=x<=X_{d1}$;

On each of these strips the gradient varies linearly for columns.

Therefore, if the number of gray levels to be assigned is N, there will be assigned N/4 gray levels with linear variations for each strip.

Figure 12:
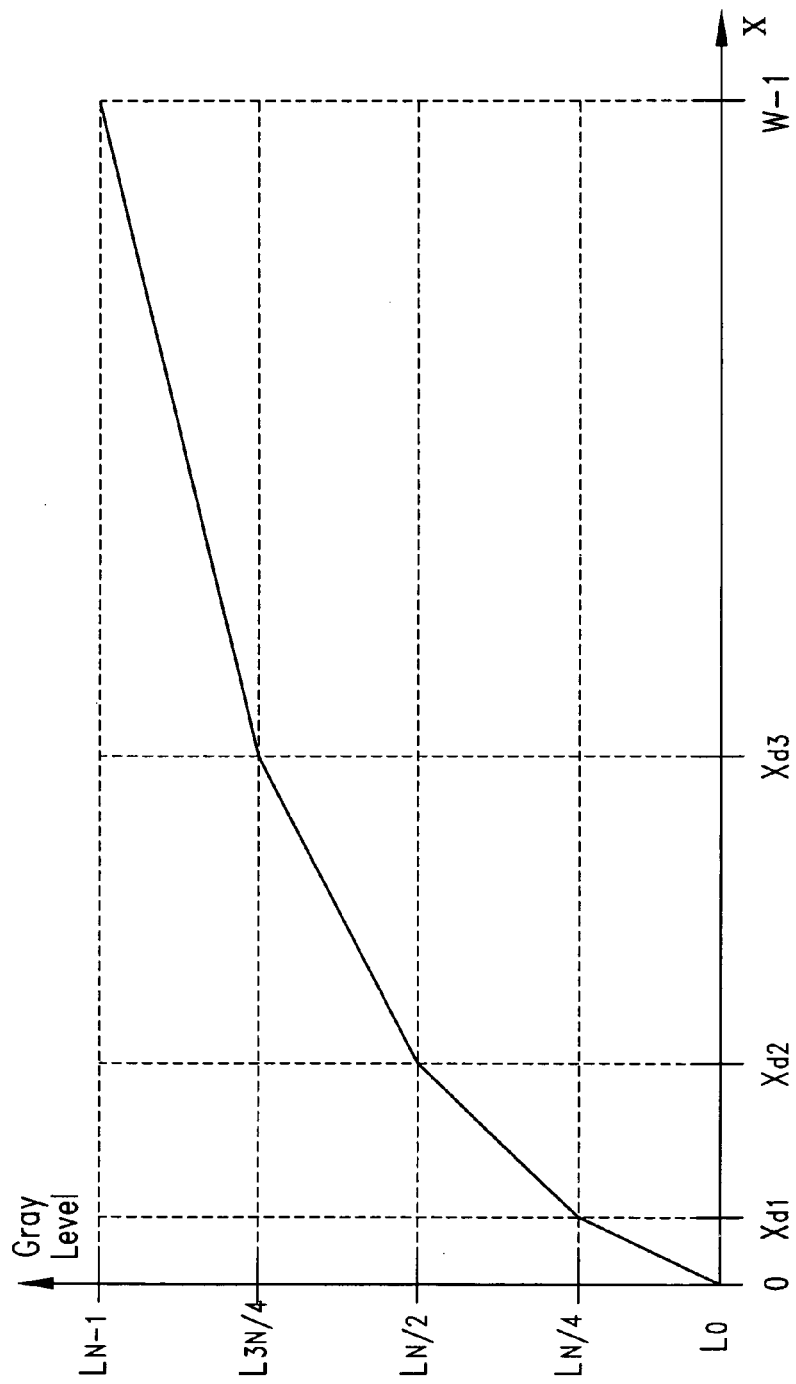

FIG. 12 shows a qualitative graph of the sectionally linear curve relating to the case of FIG. 11; the ordinates represent the gray value assigned to every column $X_i$ of the image.

The choice of a sectionally linear curve like the one shown is justified by two considerations:

- an object photographed from two different distances will occupy on the plane of the image a different pixel portion in each of the two cases; in particular, the further the observer is removed from the object, the "smaller" will this object appear: therefore, if the same gray level variation is to be maintained in it, given that the relative depth does not change, the gradient is characterized by an increment of depth levels that becomes gradually greater as the vanishing point is approached;
- the human eye succeeds more readily in distinguishing two nearby and high/(light) gray levels than two nearby and low/(dark) gray levels: it is therefore preferable to have the greatest variations in the darker areas Block 35 represents the last operation of the method in accordance with the invention. It receives as input $M_1(x,y)$ and $M_2(x,y)$ to generate the final depth map $M(x,y)$ as output. It should be noted that $M_1(x,y)$ can be a partial depth map generated for an image classified as "Landscape" or as "Other".

The manner in which the information deriving from the two components $M_1(x,y)$ and $M_2(x,y)$ are "merged" depends on the image category.

In particular we shall have if the image belongs to the internal category, then $M(x,y)$ coincides with $M_1(x,y)$:

$$M(x,y)=M_1(x,y) \text{ for } \forall x,y: 0<=x<=W-1\ 0<=y<=H-1.$$

If the image belongs to the external category with absence of significant geometric components (landscapes), then the image $M(x,y)$ is obtained by modifying in the image $M_2(x,y)$ the gray values of the pixels belonging to the regions "Land" and "Other".

The latter are updated with the gray values of the pixels corresponding, as far as position is concerned, in the image $M_1(x,y)$:

$$M(x,y)=M_1(x,y) \text{ for } \forall(x,y)\in \text{land and } \forall(x,y)\in \text{other};$$

$$M(x,y)=M_2(x,y) \text{ for } \forall(x,y))\notin \text{land and } \forall(x,y)\notin \text{other}.$$

If the image belongs to the external category with geometric components, then the image $M(x,y)$ is obtained by overwriting the gray values of the pixels that in the image $M_2(x,y)$ form part of the sky region in the corresponding pixels in the image $M_1(x,y)$. The overwriting is in reality preceded by a phase "verifying the consistency" of the regions that is carried out on the basis of the dimensions and the positions that they occupy between them:

1. $M_2(x,y)=M_2c(x,y)$;
2. $M(x,y)=M_2(x,y)$ for $\forall(x,y)\in \text{sky}$;
3. $M(x,y)=M_1(x,y)$ for $\forall(x,y)\notin \text{sky}$.

$M_{2c(x,y)}$ represents the image $M_{2(x,y)}$ after it has been subjected to the "consistency verification".

Every column of the image $M_2(x,y)$ is scanned and generates a sequence of which the structure is as follows:

| region | region cardinality 1 | region | region cardinality 2 | ... | ... |
|--------|---------------------|--------|---------------------|-----|-----| where region indicates whether the type of region identified during the scanning is "Sky" or "Non-sky" and the region cardinality indicates the number of consecutive pixels forming part of the region. Non-sky represents any one of the regions defined above, though with the obvious exception of the region "Sky".

The structure is dynamic: a new element is added every time that a new region is identified during the scanning of the column.

At this point the sequence is checked from the point of view of "consistency verification" and, if necessary, modified in accordance with the following rules:

if sequence[1].region=sky AND $\exists i > 2 :$ sequence[i].region=sky AND $\sum_{j=2}^{i-1}$ sequence[j].cardinality $>=$ H $*$ threshold_2 $\Rightarrow$ sequence[k].region=non-sky $\forall$ k$>=$i;

if sequence[i].region=sky    AND $\exists i > 2 :$ sequence[i].region=sky AND $\sum_{j=2}^{i-1}$ sequence[j].cardinality $<$ H $*$ threshold_2 AND $\not\exists j > i :$ sequence[j].region=sky AND sequence[i].cardinality $>=$ H $*$ threshold_2 $\Rightarrow$ sequence[k].region=sky $\forall$ k$<$i;

if sequence[1].region=sky AND

-continued $\exists i > 2 : \text{sequence}[i].\text{region}=\text{sky}$ AND $$\sum_{j=2}^{i-1} \text{sequence}[j].\text{cardinality} < H * \text{threshold\_2}$$ AND $/\exists j > i : \text{sequence}[j].\text{region}=\text{sky}$ AND $\text{sequence}[i].\text{cardinality} < H * \text{threshold\_2} \Rightarrow \text{sequence}[i].\text{region}=\text{non-sky};$ of $\text{sequence}[1].\text{region}=\text{sky}$ AND $\exists i > 2 : \text{sequence}[i].\text{region}=\text{sky}$ AND $$\sum_{j=2}^{i-1} \text{sequence}[j].\text{cardinality} < H * \text{threshold\_2}$$ AND $\exists j > i : \text{sequence}[j].\text{region}=\text{sky}$ AND $\text{sequence}[j].\text{cardinality} >= H * \text{threshold\_2}$ AND $$\sum_{k=i+1}^{j-1} \text{sequence}[k].\text{cardinality} >= H * \text{threshold\_1} \Rightarrow \text{sequence}$$

$[k].\text{region}=\text{sky} \; \forall k<j;$
if $\text{sequence}[1].\text{region}=\text{sky}$ AND $\exists i > i : \text{sequence}[j].\text{region}=\text{sky}$ AND $\text{sequence}[j].\text{cardinality} < H*\text{threshold\_2}$ OR $$\sum_{k=i+1}^{j-1} \text{sequence}[k].\text{cardinality} >= H * \text{threshold\_1} \Rightarrow \text{sequence}[k].\text{region}=\text{non-}$$

$\text{sky} \; \forall k>i;$
    if $\text{sequence}[1].\text{region}=\text{non-sky}$ AND
    $\exists i > 1 : \text{sequence}[i].\text{region}=\text{sky}$ AND $$\sum_{j=1}^{i-1} \text{sequence}[j].\text{cardinality} > H * \text{threshold\_2} \Rightarrow \text{sequence}[k].\text{region}=\text{non-sky}$$

$\forall k>i;$
    if $\text{sequence}[1].\text{region}=\text{non sky}$ AND
    $\exists i > 1 : \text{sequence}[i].\text{region}=\text{sky}$ AND $$\sum_{j=1}^{i-1} \text{sequence}[j].\text{cardinality} < H * \text{threshold\_2} \Rightarrow \text{sequence}[k].\text{region}=\text{sky}$$

$\forall k<i;$
    if $\text{sequence}[1].\text{region}=\text{non sky}$ AND
    $\exists i > 1 : \text{sequence}[i].\text{region}=\text{sky}$ AND $$\sum_{j=1}^{i-1} \text{sequence}[j].\text{cardinality} < H * \text{threshold\_2}$$ AND $\exists j > i \; 1 : \text{sequence}[j].\text{region}=\text{sky}$ AND $$\sum_{k=i+1}^{j-1} \text{sequence}[k].\text{cardinality} >= H * \text{threshold\_2} \Rightarrow \text{sequence}[k].\text{region}=\text{non-}$$

$\text{sky} \; \forall k>j;$
    $\text{sequence}[k].\text{region}=\text{sky} \quad \forall k<i;$
    if $\text{sequence}[1].\text{region}=\text{non-sky}$ AND
    $\exists i > 1 : \text{sequence}[i].\text{region}=\text{sky}$ AND -continued $$\sum_{j=1}^{i-1} \text{sequence}[j].\text{cardinality} < H * \text{threshold}\_2 \quad \text{AND}$$

∃j > i+1 : sequence[j].region=sky    AND $$\sum_{k=i+1}^{j-1} \text{sequence}[k].\text{cardinality} < H * \text{threshold}\_2 \quad \text{AND}$$

/∃ k>j+1 : sequence[k].region=sky    AND sequence[j].cardinality >= H * threshold_2 ⇒ sequence [z].region=sky ∀z<i;

if sequence[1].region=non-sky    AND
∃i > 1 : sequence[i].region=sky    AND $$\sum_{j=1}^{i-1} \text{sequence}[j].\text{cardinality} < H * \text{threshold}\_2 \quad \text{AND}$$

∃j > i+1 : sequence[j].region=sky    AND $$\sum_{k=i+1}^{i-1} \text{sequence}[k].\text{cardinality} < H * \text{threshold}\_2 \quad \text{AND}$$

/∃ k>j+1 : sequence[k].region=sky    AND sequence[j].cardinality<H * threshold_2 ⇒ sequence [z].region=non-sky ∀ z>i;
   sequence [k].region=sky ∀k<i;
   if sequence[1].region=non-sky    AND
   ∃i > 1 : sequence[i].region=sky    AND $$\sum_{j=1}^{i-1} \text{sequence}[j].\text{cardinality} < H * \text{threshold}\_2 \quad \text{AND}$$

∃j > i+1 : sequence[j].region=sky    AND $$\sum_{k=i+1}^{j-1} \text{sequence}[k].\text{cardinality} < H * \text{threshold}\_2 \quad \text{AND}$$

∃ k>j+1 : sequence[k].region=sky    AND
sequence [k].cardinality >=H * threshold_2 AND $$\sum_{z=j+1}^{k-1} \text{sequence}[k].\text{cardinality} < H * \text{threshold}\_1 \Rightarrow \text{sequence } [z].\text{region}=sky$$

∀ z<k;
   if sequence[1].region=non-sky AND
   ∃i > 1 : sequence[i].region=sky AND $$\sum_{j=1}^{i-1} \text{sequence}[j].\text{cardinality} < H * \text{threshold}\_2 \quad \text{AND}$$

∃j > i+1 : sequence[j]region=sky    AND $$\sum_{k=i+1}^{i-1} \text{sequence}[k].\text{cardinality} < H * \text{threshold}\_2 \quad \text{AND}$$

∃ k>j+1 : sequence[k].region=sky AND
(sequence [k].cardinality <H * threshold_2 OR -continued $$\sum_{z=j+1}^{k-1} \text{sequence}[z].\text{cardinality} > H * \text{threshold\_1} \Rightarrow \text{sequence }[z].\text{region}=\text{non-}$$

sky $\forall$ z>i;
   sequence [k].region=sky
   $\forall$k<i;
   The following values were put in a practical case;
   threshold__1=0.01;
   threshold__2=0.05;

therefore, a sequence is generated for every column of the image $M_{2(x,y)}$; as was seen above, the modification of the sequence causes an updating of the image $M_{2(x,y)}$ in $M_{2c(x,y)}$.

The depth map obtained by means of the method described above is derived from a single image and therefore from a set of starting data that is reduced as compared with the techniques that call for the analysis of several images, has a lower resolution than the resolution of the starting image, can be greatly compressed, enjoys perfect two-dimensional compatibility and makes it possible to generate stereoscopic pairs in real time. It can be obtained in a completely automatic manner when the choice of the category to which the image belongs is made in accordance with the cited patent application filed on the same day as the present application or in a partially automatic manner if the choice of category calls for the intervention of an operator.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

Naturally, the method in accordance with the invention may be put into practice with many variants with respect to the example described hereinabove. In particular, it can be applied in such a manner as to find several vanishing points in order to obtain a more detailed depth map, especially when the map is to be used for converting two-dimensional images into three-dimensional images.

From the foregoing it will be appreciated that, although specific embodiments of the invention have been described herein for purposes of illustration, various modifications may be made without deviating from the spirit and scope of the invention. Accordingly, the invention is not to be limited except as by the appended claims and the equivalents thereof.

The invention claimed is:

1. A method of obtaining a depth map from a digital image of a three-dimensional scene containing geometric objects, comprising: using a processor to perform the steps of:
   identifying in the image at least one horizontal plane or one vertical plane of the three-dimensional scene and identifying in the image at least two vanishing lines that intersect each other at a point, the identifying of at least two vanishing lines comprising the following steps:
      identifying in the image the outline of at least one geometric object of the three-dimensional scene;
      identifying a multiplicity of straight lines passing through points of the outline;
      identifying in this multiplicity of straight lines a predetermined number of straight lines and choosing from among them those that occur most frequently; and
      selecting from among the predetermined number of straight lines at least two straight lines that intersect each other at a point to be the identified vanishing lines; and
   assigning to each point of the image belonging to the identified plane, or to each of the identified planes, a depth level according to its distance from, respectively, a predetermined horizontal or vertical reference straight line of the image.

2. The method of claim 1 wherein the assigned depth level is a function of angular coefficients of the identified vanishing lines.

3. The method of claim 1 wherein the identification of at least one plane comprises the following steps:
   identifying from among the identified vanishing lines the vanishing line with the greatest angular coefficient and the vanishing line with the smallest angular coefficient;
   predetermining threshold values for the greatest and smallest angular coefficients; and
   considering the identified plane as a horizontal plane or as a vertical plane on the basis of a comparison of the angular coefficients of the vanishing lines with the greatest and smallest angular coefficient and the relative predetermined threshold values.

4. The method of claim 3 wherein the step of predetermining the threshold values of the greatest and smallest angular coefficients is based on heuristic criteria.

5. A method of obtaining a depth map from a digital image of a three-dimensional scene, comprising: using a processor to perform the steps of:
   subdividing the image into a multiplicity of homogeneous regions, associating each point of the image with a region on the basis of its chromatic characteristics;
   defining a multiplicity of image categories, including a first category of images containing predominantly geometric objects, a second category of images substantially devoid of geometric objects and a third category of images containing geometric objects;
   identifying the category to which the image belongs;
   if the image belongs to the first or the third category, putting into practice the method in accordance with the following steps in order to obtain a first partial depth map:
      identifying in the image at least one horizontal plane or one vertical plane of the three-dimensional scene and identifying in the image at least two vanishing lines that intersect each other at a point, the identifying of at least two vanishing lines comprising the following steps:
         identifying in the image the outline of at least one geometric object of the three-dimensional scene;
         identifying a multiplicity of straight lines passing through points of the outline;

identifying in this multiplicity of straight lines a predetermined number of straight lines and choosing from among them those that occur most frequently; and selecting from among the predetermined number of straight lines at least two straight lines that intersect each other at a point to be the identified vanishing lines; and assigning to each point of the image belonging to the identified plane, or to each of the identified planes, a depth level according to its distance from, respectively, a predetermined horizontal or vertical reference straight line of the image;

if the image belongs to the second category:

assigning to every point of the image a depth level in accordance with the region to which it belongs in order to form a second partial depth map;

identifying a horizon line in the image;

identifying the plane passing through the horizon line; and assigning to every point of the image belonging to the identified plane a depth level according to its distance from a predetermined horizontal reference line of the image in order to form a third partial depth map;

obtaining the depth map from the three partial maps by means of the following criterion:

if the image belongs to the first category, assuming the first partial map as the depth map of the image;

if the image belongs to the second category, merging the second and the third partial depth maps substituting the depth values of the second map associated with points belonging to at least one predetermined region with the homogeneous regions for the corresponding depth values, as far as position in the image is concerned, of the third map;

if the image belongs to the third category (landscapes with geometric objects), merging the first and the second partial maps, substituting the depth values of the second map associated with points belonging to at least one predetermined region of the homogeneous regions with the corresponding depth values of the first partial map, after having verified the consistency by examining the regions to which there belong the points of a predetermined neighbourhood around the point in question.

6. A method for digitally obtaining a depth map from a digital image of a three-dimensional scene containing geometric objects, comprising: using a processor to perform the steps of:

receiving an electronic digital image of a three-dimensional scene and identifying in the image at least one horizontal plane or one vertical plane of the three-dimensional scenes that comprise identifying in the three-dimensional scene at least two vanishing lines that intersect each other at a point, the identification of the at least two vanishing lines comprises:

identifying in the image the outline of at least one geometric object of the three-dimensional scene;

identifying a multiplicity of straight lines passing through points of the outline;

identifying in this multiplicity of straight lines a predetermined number of straight lines and choosing from among them those that occur most frequently; and selecting from among the predetermined number of straight lines at least two straight lines that intersect each other at a point to be the identified vanishing lines; and assigning to each point of the image belonging to the identified plane, or to each of the identified planes, a depth level according to its distance from, respectively, a predetermined horizontal or vertical reference straight line of the image; and assigning to each point of the image belonging to the identified plane or to each of the identified planes, a depth level according to its distance from, respectively, a predetermined horizontal or vertical reference line of the image.

7. A computer system adapted to obtaining a depth map from a digital image of a three-dimensional scene containing geometric objects, the computer system comprising:

a digital processor configured to identify in the image at least one horizontal plane or one vertical plane of the three-dimensional scene, comprising identifying in the image at least two non-parallel vanishing lines that intersect each other at a point, the identification of the at least two vanishing lines comprises the following steps:

identifying in the image the outline of at least one geometric object of the three-dimensional scene;

identifying a multiplicity of straight lines passing through points of the outline;

identifying in this multiplicity of straight lines a predetermined number of straight lines and choosing from among them those that occur most frequently; and selecting from among said predetermined number of straight lines at least two straight lines that intersect each other at a point to be the identified vanishing lines; and assigning to each point of the image belonging to the identified plane, or to each of the identified planes, a depth level according to its distance from, respectively, a predetermined horizontal or vertical reference straight line of the image; and assigning to each point in the image belonging to the identified plane or to each of the identified planes a depth level according to its distance from, respectively, a predetermined horizontal or vertical reference straight line of the image, the assigned depth level determined as a function of angular coefficients of the identified vanishing lines.

8. A method of obtaining a depth map from a digital image of a three-dimensional scene containing geometric objects, comprising: using a processor to perform the steps of:

identifying in the image at least one horizontal plane or one vertical plane of the three-dimensional scene, including identifying two vanishing lines, and further comprising:

identifying from among the identified vanishing lines a vanishing line having a greatest angular coefficient and a vanishing line with a smallest angular coefficient;

predetermining threshold values of the greatest and smallest angular coefficients;

considering the identified plane as a horizontal plane or as a vertical plane on the basis of a comparison of angular coefficients of the vanishing lines with the greatest and smallest angular coefficient and a relative predetermined threshold value; and assigning to each point of the image belonging to the identified plane or to each of the identified planes a depth level according to its distance from, respectively, a predetermined horizontal or vertical reference straight line of the image.

9. The method of claim 8 wherein the identification of the at least two vanishing lines comprises:
- identifying in the image the outline of at least one geometric object of the three-dimensional scene;
- identifying a multiplicity of straight lines passing through points of the outline;
- identifying in this multiplicity a predetermined number of straight lines and choosing from among them those that occur most frequently; and
- selecting from among the predetermined number of straight lines at least two straight lines that intersect each other at a point, assuming the selected at least two straight lines are the identified vanishing lines.

10. A computer system for obtaining a depth map from a digital image of a three-dimensional scene containing geometric objects, the system comprising a digital processor configured to perform the following steps:
- subdividing the image into a multiplicity of homogeneous regions and associating each point of the image with a region on the basis of its chromatic characteristics;
- defining a multiplicity of image categories, including a first category of images containing predominantly geometric objects, a second category of images substantially devoid of geometric objects, and a third category of images containing geometric objects;
- identifying the category to which the image belongs;
- if the image belongs to the first or the third category, then obtaining a first partial depth map by:
  - identifying in the image at least one horizontal plane or one vertical plane of the three-dimensional scene; and
  - assigning to each point of the image belonging to the identified plane, or to each of the identified planes, a depth level according to its distance from, respectively, a predetermined horizontal or vertical reference straight line of the image;
- if the image belongs to the second category:
  - assigning to every point of the image a depth level in accordance with the region to which it belongs in order to form a second partial depth map;
  - identifying a horizon line in the image;
  - identifying the plane passing through the horizon line; and
  - assigning to every point of the image belonging to the identified plane a depth level according to its distance from a predetermined horizontal reference line of the image in order to form a third partial depth map;
  - obtaining the depth map from the three partial maps by means of the following criterion:
    - if the image belongs to the first category, assuming the first partial map as the depth map of the image;
    - if the image belongs to the second category, merging the second and the third partial depth maps substituting the depth values of the second map associated with points belonging to at least one predetermined region with the homogeneous regions for the corresponding depth values, as far as position in the image is concerned, of the third map;
    - if the image belongs to the third category (landscapes with geometric objects), merging the first and the second partial maps, substituting the depth values of the second map associated with points belonging to at least one predetermined region of the homogeneous regions with the corresponding depth values of the first partial map, after having verified the consistency by examining the regions to which there belong the points of a predetermined neighbourhood around the point in question.

11. A method of obtaining a depth map from a digital image of a three-dimensional scene, comprising: using a processor to perform the steps of:
- subdividing the image into a multiplicity of homogenous regions, and associating each point of the image with a region on the basis of chromatic characteristics;
- defining a multiplicity of image categories, including a first category of images containing predominantly interiors, a second category of images substantially devoid of interiors to depict landscapes, and a third category of images containing landscapes with the geometric objects;
- identifying the category to which the image belongs;
- if the image belongs to the first or the third category, then:
  - identifying in the image at least one horizontal plane or one vertical plane of the three-dimensional scene;
  - assigning to each point of the image belonging to the identified plane, or to each of the identified planes, a depth level according to its distance from, respectively, a predetermined horizontal or vertical reference straight line of the image;
- if the image belongs to the second category, then:
  - assigning to every point of the image a depth level in accordance with a region to which it belongs in order to form a second partial depth map;
  - identifying a horizon line in the image;
  - identifying a plane passing through the horizon line;
  - assigning to every point of the image belonging to the identified plane a depth level according to its distance from a predetermined horizontal reference line of the image in order to form a third partial depth map;
  - obtaining the depth map from the three partial maps by means of the following criterion;
  - assigning to every point of the image a depth level in accordance with the region to which it belongs in order to form a second partial depth map;
  - identifying a horizon line in the image;
  - identifying the plane passing through the horizon line; and
  - assigning to every point of the image belonging to the identified plane a depth level according to its distance from a predetermined horizontal reference line of the image in order to form a third partial depth map;
  - obtaining the depth map from the three partial maps by means of the following criterion:
    - if the image belongs to the first category, assuming the first partial map as the depth map of the image;
    - if the image belongs to the second category, merging the second and the third partial depth maps substituting the depth values of the second map associated with points belonging to at least one predetermined region with the homogeneous regions for the corresponding depth values, as far as position in the image is concerned, of the third map; and
    - if the image belongs to the third category, merging the first and the second partial maps, substituting the depth values of the second map associated with points belonging to at least one predetermined region of the homogeneous regions with the corresponding depth values of the first partial map, after having verified the consistency by examining the regions to which there belong the points of a predetermined neighbourhood around the point in question.

12. A computer system for obtaining a depth map from a digital image of a three-dimensional scene, comprising:
a digital processor configured to perform the following:
subdividing the image into a multiplicity of homogeneous regions, associating each point of the image with a region on the basis of its chromatic characteristics;
defining a multiplicity of image categories, including a first category of images containing predominantly geometric objects, a second category of landscape images substantially devoid of geometric objects and a third category of images containing landscapes and geometric objects;
identifying the category to which the image belongs;
if the image belongs to the first or the third category, then obtaining a first partial depth map by:
identifying in the image at least one horizontal plane or one vertical plane of the three-dimensional scene; and
assigning to each point of the image belonging to the identified plane, or to each of the identified planes, a depth level according to its distance from, respectively, a predetermined horizontal or vertical reference straight line of the image;
if the image belongs to the second category:
assigning to every point of the image a depth level in accordance with the region to which it belongs in order to form a second partial depth map;
identifying a horizon line in the image;
identifying the plane passing through the horizon line; and
assigning to every point of the image belonging to the identified plane a depth level according to its distance from a predetermined horizontal reference line of the image in order to form a third partial depth map;
obtaining the depth map from the three partial maps by means of the following criterion:
if the image belongs to the first category, assuming the first partial map as the depth map of the image;
if the image belongs to the second category, merging the second and the third partial depth maps substituting the depth values of the second map associated with points belonging to at least one predetermined region with the homogeneous regions for the corresponding depth values, as far as position in the image is concerned, of the third map; and
if the image belongs to the third category, merging the first and the second partial maps, substituting the depth values of the second map associated with points belonging to at least one predetermined region of the homogeneous regions with the corresponding depth values of the first partial map, after having verified the consistency by examining the regions to which there belong the points of a predetermined neighbourhood around the point in question.

13. A method of obtaining a depth map from a digital image of a three-dimensional scene containing geometric objects, comprising: using a processor to perform the steps of:
identifying in the image at least one horizontal plane or one vertical plane of the three-dimensional scene, comprising:
identifying in the image at least two vanishing lines;
identifying in the image the outline of at least one geometric object of the three-dimensional scene;
identifying a multiplicity of straight lines passing through points of the outline;
identifying in this multiplicity a predetermined number of straight lines and choosing from among them those that occur most frequently;
selecting from among said predetermined number of straight lines at least two straight lines that intersect each other at a point, assuming them to be the identified vanishing lines;
assigning to each point of the image belonging to the identified plane, or to each of the identified planes, a depth level according to its distance from, respectively, a predetermined horizontal or vertical reference straight line of the image.

14. The method in of claim 13 wherein the assigned depth level is a function of angular coefficients of the identified vanishing lines.

15. A method of obtaining a depth map from a digital image of a three-dimensional scene containing geometric objects, comprising: using a processor to perform the steps of:
identifying in the image at least one horizontal plane or one vertical plane of the three-dimensional scene, comprising identifying in the image at least two vanishing lines, and identifying from among the identified vanishing lines the vanishing lines with the greatest angular coefficient and the vanishing line with the smallest angular coefficient;
predetermining threshold values for the greatest and smallest angular coefficients;
considering the identified plane as a horizontal plane or as a vertical plane on the basis of a comparison of the angular coefficients of the vanishing lines with the greatest and smallest angular coefficient and the relative predetermined threshold values; and
assigning to each point of the image belonging to the identified plane, or to each of the identified planes, a depth level according to its distance from, respectively, a predetermined horizontal or vertical reference straight line of the image.

16. The method in of claim 15 wherein the assigned depth level is a function of angular coefficients of the identified vanishing lines.

17. The method of claim 15 wherein the identification of at least two vanishing lines comprises the following steps:
identifying in the image the outline of at least one geometric object of the three-dimensional scene;
identifying a multiplicity of straight lines passing through points of the outline;
identifying in this multiplicity a predetermined number of straight lines and choosing from among them those that occur most frequently; and
selecting from among said predetermined number of straight lines at least two straight lines that intersect each other at a point, assuming them to be the identified vanishing lines.

18. In a computer system, a method of processing a single digital image of a three-dimensional scene, comprising: a the computer system implementing the following:
performing edge outline detection of geometric shapes in the digital image and generating two images therefrom that are combined into a single binary image;
identifying straight lines and corresponding intersection points of the straight lines with edge points in the binary image;
determining intersections of pairs of the straight lines that cross each other;
identifying as a vanishing point the intersection point having the most intersections of pairs of the straight lines around it;
identifying as two vanishing lines the two straight lines passing closest to the vanishing point; and assigning a depth to each pixel in the single digital image by using a slope and position of the two vanishing lines.

19. The method of claim 18 wherein the edge outline detection is performed using 3×3 Sobel masks to generate the two images, and further comprising normalizing the two images prior to converting the two images into the binary image to eliminate redundant information.

20. The method of claim 19 wherein performing the edge outline detection is followed by a subsequent step of noise reduction of the two images using a low-pass filter.

21. The method of claim 18 wherein identifying straight lines and corresponding intersection points of straight lines passing through the plurality of edge points in the binary image comprises detection of the straight lines using the two images and determining the slope and intersection with a y-axis of the straight lines.

22. The method of claim 21 wherein the slope and intersection of each straight line is sampled and stored in an accumulation matrix.

\* \* \* \* \*

UNITED STATES PATENT AND TRADEMARK OFFICE
CERTIFICATE OF CORRECTION

PATENT NO. : 7,668,377 B2
APPLICATION NO. : 10/893103
DATED : February 23, 2010
INVENTOR(S) : Salvatore Curti et al.

Page 1 of 1

It is certified that error appears in the above-identified patent and that said Letters Patent is hereby corrected as shown below:

Title Page Item (73) Assignee
"STMicroelectronics S.r.L., Agrate Brianza (IT)" should read --STMicroelectronics S.r.I., Agrate Brianza (IT)--.

Column 30, Line 53
The line "digital image of a three-dimensional scene, comprising: a the" should read --digital image of a three-dimensional scene, comprising: a--.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

PATENT NO.         : 7,668,377 B2                      Page 1 of 1
APPLICATION NO.    : 10/893103
DATED              : February 23, 2010
INVENTOR(S)        : Curti et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1091 days.

Signed and Sealed this

Seventh Day of December, 2010

David J. Kappos
*Director of the United States Patent and Trademark Office*